United States Patent
Priez et al.

(10) Patent No.: US 12,195,396 B2
(45) Date of Patent: Jan. 14, 2025

(54) COMPOSITION FOR SURFACING LIGHTLY TRAFFICKED THOROUGHFARES, ALLOWING PLANT GROWTH TO BE LIMITED OR EVEN COMPLETELY SUPPRESSED

(71) Applicant: COLAS, Paris (FR)

(72) Inventors: Christophe Priez, Sailly sur la Lys (FR); Christian Raynaud, Marcq en Baroeul (FR)

(73) Assignee: COLAS, Paris (FR)

( * ) Notice: Subject to any disclaimer, the term of this patent is extended or adjusted under 35 U.S.C. 154(b) by 678 days.

(21) Appl. No.: 17/605,089

(22) PCT Filed: Apr. 22, 2020

(86) PCT No.: PCT/FR2020/050681
§ 371 (c)(1),
(2) Date: Oct. 20, 2021

(87) PCT Pub. No.: WO2020/217019
PCT Pub. Date: Oct. 29, 2020

(65) Prior Publication Data
US 2022/0204404 A1     Jun. 30, 2022

(30) Foreign Application Priority Data
Apr. 23, 2019   (FR) ..................... 1904277

(51) Int. Cl.
*C04B 20/00*   (2006.01)
*C04B 14/06*   (2006.01)
(Continued)

(52) U.S. Cl.
CPC .......... *C04B 20/0076* (2013.01); *C04B 14/06* (2013.01); *C04B 26/26* (2013.01);
(Continued)

(58) Field of Classification Search
None
See application file for complete search history.

(56) References Cited

FOREIGN PATENT DOCUMENTS

EP   1582628   10/2005
FR   2 768 162   3/1999
(Continued)

OTHER PUBLICATIONS

FR-2768162-A3, English translation (Year: 1997).*
(Continued)

*Primary Examiner* — Stefanie J Cohen
(74) *Attorney, Agent, or Firm* — NIXON & VANDERHYE (57) ABSTRACT

Disclosed is a draining composition for a light-traffic road pavement, including: (a) a first granular layer having a percentage of communicating voids ranging 25-50%, including a binder and a granular mixture of which at least 80% by weight, relative to the total weight of the granular mixture, has a granular size distribution range 4-20 mm, the layer having a thickness suitable for the pavement's mechanical strength; (b) a second granular layer having main lower and upper surfaces, the main lower surface resting directly on the first granular matrix and the main upper surface in direct contact with the air, the second granular layer being a granular mixture not bound by a binder and of which at least 80% by weight, relative to the total weight of the granular mixture, has a granular size distribution range 2-14 mm, the second granular layer having a thickness appropriate for water accumulation.

21 Claims, 2 Drawing Sheets

(51) Int. Cl.
*C04B 26/26* (2006.01)
*C04B 111/00* (2006.01)
*E01C 7/08* (2006.01)
*E01C 7/18* (2006.01)
*E01C 11/22* (2006.01)

(52) U.S. Cl.
CPC ............... *C04B 2111/00284* (2013.01); *C04B 2111/00413* (2013.01); *C04B 2111/00612* (2013.01); *C04B 2111/0075* (2013.01); *E01C 7/085* (2013.01); *E01C 7/18* (2013.01); *E01C 11/226* (2013.01); *E01C 2201/04* (2013.01)

(56) References Cited

FOREIGN PATENT DOCUMENTS

| | | | |
|---|---|---|---|
| FR | 2768162 A3 * | 3/1999 | ............ E01C 11/226 |
| FR | 2 981 373 | 4/2013 | |
| WO | 2016/019933 | 2/2016 | |

OTHER PUBLICATIONS

International Search Report for PCT/FR2020/050681 dated Oct. 5, 2020, 2 pages.
Written Opinion of the ISA for PCT/FR2020/050681 dated Oct. 5, 2020, 6 pages.

* cited by examiner

COMPOSITION FOR SURFACING LIGHTLY TRAFFICKED THOROUGHFARES, ALLOWING PLANT GROWTH TO BE LIMITED OR EVEN COMPLETELY SUPPRESSED

This application is the U.S. national phase of International Application No. PCT/FR2020/050681 filed Apr. 22, 2020 which designated the U.S. and claims priority to FR Patent Application No. 1904277 filed Apr. 23, 2019, the entire contents of each of which are hereby incorporated by reference.

A*) FIELD OF THE INVENTION

The present invention relates to the field of road pavements intended for light traffic, such as light roads, parking lots, bicycle paths, pedestrian walkways, and so on.

In particular, the present invention relates to a draining composition for road pavements intended for light traffic that is, in particular, capable of limiting the growth of plants and/or significantly reducing and even eliminating the use of phytosanitary products.

It further relates to road pavements that are made from this composition and to the uses of said draining composition for road pavements intended for light traffic.

B*) PRIOR ART

In the context of the present application, a road is considered to have low traffic when the number of vehicles traveling on it is less than the equivalent of 150 heavy vehicles per day, i.e. approximately 1500 vehicles per day, all models combined. This term covers a very large number of road/roadways, such as communal roads, agricultural, wine-growing or forestry roads, industrial traffic areas, parking lots, or bicycle paths and pedestrian walkways. Road pavements intended for private parties, such as driveways and the like, also come under this definition.

However, when a road or a surface covering is subjected to light or even non-existent traffic, the contribution of external items such as seeds or various wind deposits (sand, soil, etc.) carried, for instance, by the wind, insects, or birds, can lead to uncontrolled growth of plants, such as weeds or grasses.

In particular, for certain roadways with video surveillance, such as the detection paths of the Electrical Power Grid (RTE) substations, plant growth can also cause inadvertent triggering of the motion detection camera and thus trigger security alarms. In addition, in the particular case of these paths of electrical power transformer substations, the pavement used must have a good level of resistivity—that is, a capacity to oppose the flow of an electric current—of at least 3000 ohm-meters (resistance of a section of material measuring one meter long and with a cross-section of one square meter). This property makes it possible to limit the formation of electric arcs when the substation is operating.

In order to limit and even eliminate the growth of such plants on surface coverings, the use of phytosanitary products or thermal burners is currently known.

However, at the current time these two techniques are not entirely satisfactory.

In particular, the term "phytosanitary products" refers to substances that encompass phytopharmaceutical products that are used to combat plant diseases, animal pests (insects), and weeds (which invade crops), as well as biocides. However, these products generally have a negative impact on the environment and may involve a non-negligible level of pollution as they can be found in the surrounding ground, air, and aquatic environment. In addition, they need to be applied regularly and therefore account for a relative high cost of maintenance for low-traffic roadways.

On the other hand, thermal burners, and especially thermal weed burners, are more economical. However, they are not appropriate for use on large surface areas. Indeed, their use for treating a low-traffic roadway is quite exhausting. Furthermore, they do not prevent the future development of weeds or other plants. Consequently, with this type of burner, it is similarly necessary to treat a low-traffic roadway several times a year.

Draining road compositions have also been proposed in the prior art.

In particular, document FR 2 768 162 describes a road structure comprising a supporting later (foundation layer) covered with a draining road pavement. This draining pavement comprises a sublayer on which a surface layer is placed, allowing for an interface between them. Both the sublayer and the surface layer are made of a permeable porous coated material. The sublayer and the surface layer comprise a binder.

Document FR 2 981 373 describes a draining ground covering, characterized in that said covering comprises:
  a layer structural layer made of draining concrete consisting of an agglomerate of at least 60% by weight of granular size G1 gravel (4/25, preferably 4/20), bound by a cement-type hydraulic binder, said lower layer having a P1 open porosity,
  an upper layer covering said lower layer, made of an agglomerate of aggregates with a G2 granular size (0.5/8, preferably 1/4), less than granular size G1, bound by an epoxy-type resin, said upper layer having a P2 open porosity with a value equal to or less than P1.

Document EP 1 585 628 describes a method for making a slab from water-permeable artificial rock with at least two layers.

Nevertheless, there is still a need in the current state of the art for new solutions making it possible to significantly reduce and even to outright prevent the growth of plants, particularly on light-traffic roadways, while preferably being easy to implement and easy to maintain.

There is also a need in the current state of the art for new solutions, and particularly for new coverings intended for light traffic, that furthermore afford a resistivity of at least 3000 ohm-meters during the wet phase (measured according to an internal protocol of the RTE company and which will be described below in the experimental portion of this application).

The purpose of the present invention is therefore to propose a new road surface composition intended for light traffic that avoids the drawbacks mentioned above, at least in part.

C*) SUBJECT MATTER OF THE INVENTION

To that end, the subject matter of the present invention is a draining composition for a light-traffic road pavement intended to cover a ground, comprising:
  (a) a first granular layer, referred to as a draining layer, having a percentage of communicating voids (measured according to an internal protocol of the RTE company, which will be described below in the experimental portion of this application) ranging from 25% to 50%, and which comprises at least one binder and a granular mixture of which at least 80% by weight, with respect to the total weight of the granular mixture, has a granular-size distribution ranging from 4 to 20 mm, said first granular layer having a layer thickness suitable for or configured so as to ensure the mechanical strength of the light-traffic road pavement;

(b) a second granular layer, referred to as a free layer, having a main lower surface and a main upper surface, said main lower surface resting directly on said first granular layer and said main upper surface being in direct contact with the air, said second granular layer being composed of a granular mixture that is not bound by a binder and of which at least 80% by weight, in relation to the total weight of the granular mixture, has a granular size distribution ranging from 2 to 14 mm, said second granular layer having a layer thickness suitable for or configured so as not to cause water accumulation, the granular mixture of the second granular layer having a granular size distribution which is less than that of the granular mixture of the first granular layer.

Preferably, said first granular layer has a percentage of communicating voids (measured according to an internal protocol) ranging from 30% to 40%.

According to a feature of the invention, at least 85%, preferably at least 90%, and typically 85% to 100% by weight, with respect to the total weight of the granular mixture of the first granular layer, has a granular size distribution ranging from 6 to 20 mm.

Advantageously, the granular mixture of the first granular layer comprises the granular size fractions 4/12.5; 4/10 mm; 6.3/10 mm; 6/12.5 mm; 10/14 mm; 14/20 mm or one of the mixtures thereof.

In general, said first granular layer in addition has a layer thickness suitable for or configured so as to allow for the absorption of rain water and the percolation thereof through the ground.

In particular, said first granular layer has a layer thickness ranging from 5 to 25 cm, preferably ranging from 7 to 20 cm, and even more preferably ranging from 8 to 15 cm, and typically ranging on the order of 9 to 12 cm, and is in particular on the order of 10 cm.

Preferably, said first granular layer has a water percolation rate equal to or greater than $1 \times 10^{-5}$ m/s, and preferably ranging from $5 \times 10^{-2}$ m/s to $8 \times 10^{-2}$ m/s measured according to standard NF EN 12697-40 (November 2012).

According to another feature of the invention, at least 85%, preferably at least 90%, and typically 90% to 100% by weight, with respect to the total weight of the granular mixture of the second granular layer, has a granular size distribution ranging from 2 to 14 mm.

Advantageously, the granular mixture of the second granular layer comprises the granular size fractions 2/4 mm; 4/6 mm; 6/10 mm, or one of the mixtures thereof.

In general, said second granular layer has a layer thickness ranging from 1.5 to 5 cm, preferably ranging from 2 to 4 cm, and even more preferably ranging from 2 to 3 cm.

According to a particular embodiment of the invention,
  when the granular mixture of the first granular layer has the fraction 4/12.5; 4/10 mm; 6.3/10 mm; 6/12.5 mm, the granular mixture of the second granular layer has the fraction 2/4 mm;
  when the granular mixture of the first granular layer has the fraction 10/14 mm, the granular mixture of the second granular layer has the fraction 4/6 mm;
  when the granular mixture of the first granular layer has the fraction 14/20 mm, the granular mixture of the second granular layer has the fraction 6/10 mm.

Preferably, the binder of the first granular layer is chosen from a bituminous binder, a hydraulic binder, an organo-mineral binder, or one of the mixtures thereof.

In particular, the binder accounts for less than 15% by weight, preferably from 1% to 10%, with respect to the total weight of the first granular layer.

The subject matter of the present invention is also a light-traffic road pavement comprising the draining composition as described above.

In particular, the light-traffic road pavement has a wet phase resistivity of at least 3000 ohm-meters (measured according to an internal protocol of the RTE company, which will be described below in the experimental portion).

Lastly, the subject matter of the present invention is the use of a draining composition as defined above or of the road pavement mentioned above,
  to limit or prevent the growth of plants, such as weeds and grasses, and/or
  to reduce or eliminate the use of phytosanitary products.

Naturally, the various features, variants, and embodiments of the invention can be combined with each other in various combinations to the extent that they are not mutually incompatible or exclusive.

In the remainder of the description, unless specified otherwise, the indication of a range of values "from X to y" or "between X and Y" in the present invention shall be understood as inclusive of the values X and Y.

D) DESCRIPTION OF THE FIGURES

In addition, various other features of the invention will become apparent from the included description, provided in reference to the drawings, which illustrate non-limiting embodiments of the invention, and in which.

It should be noted that, in these figures, the structural and/or functional elements that are common to the different variants may have the same reference numbers.

E*) DETAILED DESCRIPTION OF THE INVENTION

The Applicant has focused on developing a new draining composition suitable for making light-traffic road pavements intended for parking lots, bicycle paths, pedestrian walkways, and detection paths of electrical power transformer substations that makes it possible to limit and even prevent the growth of plants, such as weeds.

As mentioned earlier, plants or grasses indeed have a tendency to grow uncontrollably on light-traffic roadways thanks to the combined action of heat, water, and external elements (bird droppings, seeds carried by birds, etc.), as the light road traffic is not sufficient to destroy this plant growth.

However, the Applicant has unexpectedly discovered that the simple use of a draining composition comprising two specific overlapping layers could limit and even totally eliminate the use of phytosanitary products. In particular, the use of a draining composition made, on the one hand, from a first granular layer, referred to as a draining layer, having a high percentage of communicating voids and therefore having a high level of permeability, and, on the other hand, from a second granular layer, referred to as a free layer, made of free aggregates not bound by a binder and having a relatively small thickness, made it possible to reduce and even prevent the growth of plants and therefore to limit and even eliminate the use of phytosanitary products.

Indeed, as demonstrated by the tests described in the experimental section below, the Applicant has demonstrated that after 7 months no growth of weeds was observed on the surface of the draining compositions according to the invention, or, in the case of two examples, there was some very spotty regrowth that languished until it disappeared on its own due to the absence of water needed for its growth.

Without being bound to any particular theory, it would seem first off that the free layer which is placed directly on the draining layer like a mulching material, and which corresponds to the surface layer, makes it possible, thanks to its limited thickness, to avoid any formation of water reserves and thus to prevent any root development (rain water can penetrate this layer but does not stagnate in it). Furthermore, this free layer seems to act as a protective film or filter preventing grasses and other external polluting elements from penetrating the draining layer. In addition, it has the advantage of being capable of being easily cleaned by light raking, either done manually or mechanically (possibility of distributing the aggregates and remixing them), if this should become necessary.

Then, thanks to its high permeability and draining structure (high percentage of communicating voids), the draining layer apparently makes it possible to absorb water, particularly in the case of heavy rain, and thus allow for its natural evacuation through the ground (percolation). However, as it is kept far from the surface by the free layer, it does not appear to allow plants to take root, even if it is likely to store water in the event of rain. In addition, the draining structure of this layer has the advantage of obviating the need to create a drainage system for the road thus made. Lastly, it generally has a thickness suitable for or configured to allow for pedestrian and light-vehicle traffic and, more generally speaking, to form a light-traffic roadway as defined earlier.

In addition, the draining composition according to the invention also has the advantage of exhibiting a high level of resistivity equal to or greater than 3000 ohm-meters in the wet phase, which is therefore suitable for making detection paths of electrical power transformer substations as required by the RTE company.

In addition, the draining composition according to the invention has the advantage of being easy to implement. According to one embodiment, it can be prepared cold, either in a permanent mixing plant (dedicated industrial site) or in a mobile plant located in the vicinity of the construction location (on-site production), and therefore without the need for it to be made in a hot mixing plant, as in the case of hot bituminous products, and to be transported to the application location. Indeed, low-traffic roadways are generally narrow and can be located far from industrial sites (permanent plant). Consequently, with this cold fabrication embodiment, it is advantageous that the composition can be transported over long distances and can be produced at the implementation location with relatively light mechanical equipment.

Lastly, the draining composition according to the invention requires little prior preparation of the ground on which it will be applied; generally only the capping layer is required to provide the necessary support for traffic and to eliminate the existing root system, if any. Indeed, in addition to not requiring the creation of a water drainage system, the ground to be covered generally only needs a planing off in order to then accommodate the draining composition according to the invention.

Consequently, the subject matter of the present invention is a draining composition for a light-traffic road pavement intended to cover a ground, comprising:
  (a) a first granular layer, referred to as a draining layer, having a percentage of communicating voids, measured according to an internal protocol, ranging from 25% to 50%, and which comprises at least one binder and a granular mixture of which at least 80% by weight, with respect to the total weight of the granular mixture, has a granular-size distribution ranging from 4 to 20 mm, said first draining granular matrix having a layer thickness suitable for or configured so as to ensure the mechanical strength of the light-traffic road pavement;
  (b) a second granular layer, referred to as a free layer, having a main lower surface and a main upper surface, said main lower surface resting directly on said first granular matrix and said main upper surface being in direct contact with the air, said second granular layer being composed of a granular mixture that is not bound by a binder and of which at least 80% by weight, in relation to the total weight of the granular mixture, has a granular size distribution ranging from 2 to 14 mm, said second granular matrix having a layer thickness suitable for or configured so as not to cause water accumulation,
  the granular mixture of the second granular layer having a granular size distribution which is less than that of the granular mixture of the first granular layer.

The draining composition will be described in greater detail hereinafter in reference to FIG. 1 and FIG. 2 according to the invention.

Figure 1:
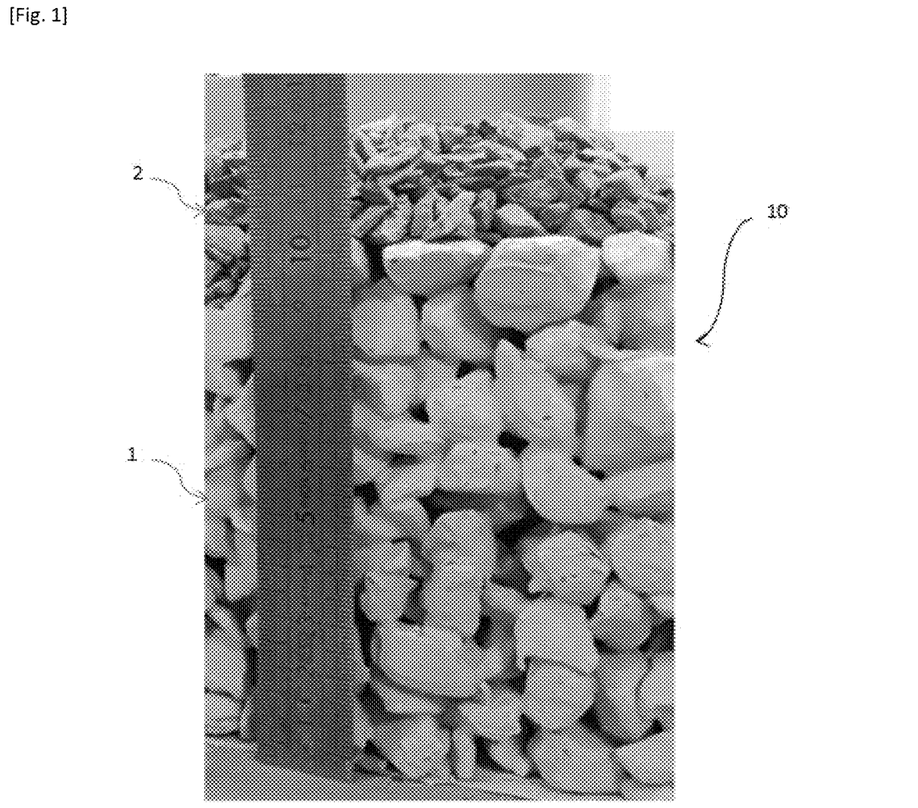
FIG. 1 is a photograph showing a cross-sectional view of the draining composition of the invention according to a first embodiment.
Figure 2:
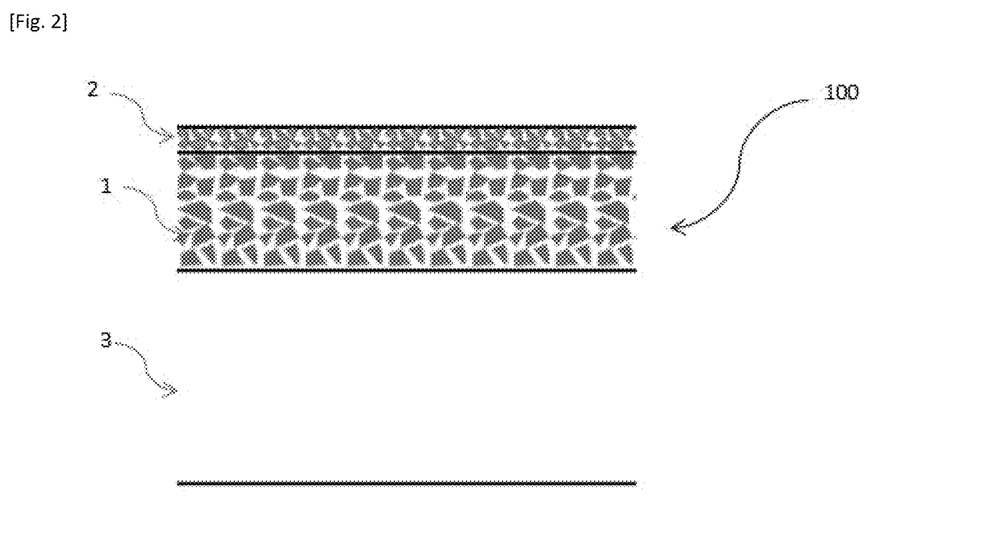
FIG. 2 is a schematic drawing showing a cross-sectional view of a light-traffic road pavement made from the draining composition according to the invention; the binder of the first granular layer is a hydraulic binder.

FIG. 1 shows a photograph of a cross-section of the draining composition 10 according to the invention, while FIG. 2 is a diagram representing a cross-sectional view of the light-traffic pavement 100 made from the draining composition 10.

In particular, the draining composition 10 comprises a first granular layer, referred to as draining layer 1, on which a second granular layer, referred to as free layer 2, is directly placed.

Thus, this free layer 2 has a main lower surface which is in direct contact with the draining layer 1, and an upper surface which is in direct contact with the air. Indeed, the free layer 2 is intended to correspond to the surface layer of the light-traffic road pavement 100, that is, the layer on which pedestrians, bicycles, or motor vehicles can travel.

The draining layer 1 also has a main upper surface which is directly in contact with the lower surface of the free layer 2, and a lower surface which is intended to cover or to be placed on a capping layer or a roadbed 3 generally forming a part of the light-traffic road pavement 100. As applicable, the ground is first planed off, that is, the old pavement made, for example, of a subbase, road base, a binder course, and/or a surface layer, or at least one of the layers of which it is made, has been removed.

This roadbed 3 corresponds most often to a capping layer for a light-traffic roadway as described above. In France, the roadbed classes are defined in the "Guide des terrassements routiers" (GTR) [Guide to Roadway Excavation], 2000 edition. This guide establishes four classes according to the value ranges of their modulus of deformation: PF1 (between 20 and 50 MPa), PF2 (between 50 and 120 MPa), PF3 (between 120 and 200 MPa), and PF4 (>200 MPa). The design standard for new roadway structures, NF P 98-086, 2011 edition, divided class PF2 into two classes: PF2 (between 50 and 80 MPa) and PF2qs (higher quality PF2, between 80 and 120 MPa). In the context of this invention, the capping layer or the roadbed 3 of the light-traffic road pavement 100 preferably has a minimal class corresponding to PF2, that is, the modulus of deformation is equal to or greater than 50 MPa.

The draining layer 1 according to the invention will be described in greater detail below.

First of all, the draining layer 1, as mentioned above, has a percentage of communicating voids, as measured according to an internal protocol, ranging from 25% to 50%, preferably ranging from 30% to 40%. In the present invention, the terms "percentage of communicating voids" and "percentage of voids" in connection with the draining layer 1 are used interchangeably.

According to the invention, "a percentage of voids ranging from 25% to 50%" comprises the following values or any range between any two of these values: 25; 26; 27; 28; 29; 30; 31; 32; 33; 34; 35; 36; 37; 38; 39; 40; 41; 42; 43; 44; 45; 46; 47; 48; 49 and 50%.

In addition, this draining layer 1 advantageously has a high level of permeability, that is, a water percolation rate measured according to standard NF EN 12697-40 (November 2012) that is equal to or greater than $1\times10^{-5}$ m/s, in particular ranging from $1\times10^{-5}$ m/s to $8\times10^{-2}$ m/s and advantageously ranging from $5\times10^{-2}$ m/s to $8\times10^{-2}$ m/s.

To that end, the draining layer 1 comprises at least: a binder and a granular mixture of which at least 80% by weight, with respect to the total weight of the granular mixture, has a granular size distribution ranging from 4 to 20 mm.

Preferably, at least 85%, preferably at least 90%, and typically 85% to 100% by weight, with respect to the total weight of the granular mixture of the first granular layer, has a granular size distribution ranging from 4 to 20 mm, referred to hereinafter as the first granular size fraction 4/20.

According to the invention, a granular size class or fraction, notated as d/D where d<D, refers to a range of particle sizes in terms of lower sieve size (d) and upper sieve size (D), expressed in mm, and thus contains particles of which the diameter varies from d to D; a granular size class, notated as 0/d' where 0<d', refers to a range of particle sizes in terms of lower sieve size (0) and upper sieve size (d'), expressed in mm, and thus contains particles of which the diameter varies from 0 to d'. The size of a particle, and more generally of a component in a granular mixture, corresponds to its diameter if the component has a spherical shape. If the component does not have a spherical shape, its size corresponds to the length of its primary axis, that is, the longest straight line that can be drawn between one end of the component and an opposite end.

According to the invention, "at least 80% by weight, with respect to the total weight of the granular mixture, has a granular size distribution ranging from 6 to 20 mm (6/20)" comprises the following values or any range between any two of these values: 80; 81; 82; 83; 84; 85; 86; 87; 88; 89; 90; 91; 92; 93; 94; 95; 96; 97; 98; 99 and 100%.

Generally, the granular mixture of the draining layer 1, and in particular the first granular mixture 4/20, comprises the following granular size classes: 4/12.5; 4/10 mm; 6.3/10 mm; 6/12.5 mm; 10/14 mm; 14/20 mm or one of the mixtures thereof, and preferably the following granular size classes: 4/12.5; 4/10 mm; 6.3/10 mm; 6/12.5 mm; 10/14 mm or one of the mixtures thereof. These granular size classes are understood in accordance with standard NF P P18-545 (September 2011).

In addition, the granular mixture of the draining layer 1 may comprise a second granular size fraction of which the aggregates have a granular size distribution equal to or less than 4 mm (0/4 with 0 not included), preferably equal to or less than 2 mm (0/2 with 0 not included), such as sands and very fine sands.

In particular, the second granular size fraction 0/4 or 0/2 of the granular mixture of the draining layer 1 comprises the following granular size classes: 0/2; 0/4 or one of the mixtures thereof. These granular size classes are understood in accordance with standard NF P P18-545 (September 2011).

Generally, in this case the second granular size fraction (0/4 or 0/2) does not account for more than 15% by weight, preferably not more than 10% by weight, and typically not more than 8% by weight with respect to the total weight of the granular mixture of the draining layer 1.

Indeed, the presence of sand and/or very fine sand in the granular mixture of the draining layer 1 can have the effect of lowering the resistivity of the composition 10 according to the invention. Thus, according to one embodiment, the granular mixture of the draining layer 1 does not comprise a second granular size fraction 0/4 and/or 0/2.

However, for other applications, the presence of sand/very fine sand improves or strengthens the mechanical structure of the draining composition 10 according to the invention. Thus, according to another embodiment, the granular mixture of the draining layer 1 comprises the second granular size fraction 0/4 and/or 0/2.

In particular, it is advantageous for the granular mixture of the draining layer 1 to comprise the second granular size fraction 0/4 and/or 0/2 when the binder used is a hydraulic binder.

Preferably, the D60/D10 uniformity coefficient (UC), as measured by sifting, of the granular mixture of the draining layer 1, that is, comprising the first 6/20 granular mixture optionally with the second 0/4 or 0/2 granular mixture, is equal to or less than 6, and even more preferably equal to or less than 5, and typically equal to or less than 4.

According to the invention, the D60/D10 uniformity coefficient is characterized as follows:
UC=uniformity coefficient;
D60=the sieve corresponding to 60% of the cumulative material passing through on the granular size curve;
D10=the sieve corresponding to 10% of the cumulative material passing through on the granular size curve.

The granular mixture of the draining layer 1 and the granular mixture of the free layer 2 can be composed of natural, artificial, or recycled aggregates independently of each other, and are generally natural aggregates.

The term "natural aggregate" refers to an aggregate that has not undergone any deformation other than mechanical deformation. The term "artificial aggregate" refers to an aggregate of mineral origin made by an industrial method comprising thermal or other processing. The term "recycled aggregate," also referred to as "recycled asphalt pavement (RAP)," refers to an aggregate originating from demolition products (such as coated materials from old roads that has been crushed and/or milled).

According to the invention, the aggregates of the first 4/20 granular size fraction of the draining layer 1 can be gravel, pea gravel, or a mixture thereof, without limitation.

The aggregates of the second 0/4 or 0/2 granular size fraction of the draining layer 1 can be sand, very fine sand, or a mixture thereof, without limitation. According to the invention, sands are generally any rock in the form of small non-bound granulars having a size ranging up to 4 mm, whereas very fine sands are sands with a very fine granular size.

The aggregates used can be road aggregates complying with the following standards: NF EN 13043 (2003) in Europe and ASTM C33 in the United States of America.

Generally, the aggregates of the draining layer 1 have a true density, as measured according to standard NF EN 1097-6, greater than 2000 kg/m$^3$ and even greater than 2500 kg/m$^3$, and a bulk density, as measured according to standard NF EN 1097-3 (1998), of between 1.2 and 1.7.

As mentioned earlier, the granular mixture of the draining layer 1 is bound by a binder.

According to the invention, a "binder" refers to a compound capable of hardening and/or binding together granular materials so as to ensure granular cohesion.

In particular, various types of binder can be suitable for making the draining layer 1.

In general, the binder of the draining layer 1 is chosen from: a bituminous binder, a hydraulic binder, a non-bituminous or non-hydraulic binder, such as an organo-mineral binder, or a mixture thereof. These binders are known to a person skilled in the art.

According to the invention, a bituminous binder is a mixture of natural hydrocarbons coming from the heavy fraction obtained in petroleum distillation, or coming from natural deposits occurring in solid or liquid form, with a density that is generally between 0.8 and 1.2. It can be prepared by any conventional technique, that is, either hot or cold.

For example, the bituminous binders that are deemed suitable for the invention are the binders defined in any one of the following standards: NF EN 12591 (December 2009), NF EN 13808 (August 2013); NF EN 15322 (August 2013), NF EN 14023 (June 2010), and NF EN 13924 (December 2006).

The bitumen can thus be a modified bitumen as defined in standard NF EN 14023 (June 2010). For example, the bitumens are modified by the incorporation of any type of additive, such as additives for the purpose of improving adhesion properties, the ability to withstand extreme temperatures (both high and low), or mechanical strength with high or harsh traffic. Let us mention bitumens that are improved by the incorporation of rubber-powder elastomers or synthetic or natural plastomers (polybutadiene, styrene-butadiene rubber or SBR), SBS, EVA, or others. It is also possible to use mixtures of different types of bitumens.

In particular, the bituminous binder has a high degree of penetrability at 25° C., as determined according to standard EN 1426, of 10/20, 15/25, 20/30, 40/60, 35/50, 50/70, 70/100, 160/220, 1/10 mm or a mixture thereof.

Also acceptable as bitumens pursuant to the invention are binders of plant origin, such as Vegecol®, marketed by the Colas company and described in patent application FR 2 853 647, and synthetic binders of petroleum origin such as the Bituclair® line of binders marketed by the Colas company.

As an example, according to one embodiment in which the draining layer 1 is prepared cold, the bituminous binder is chosen from a cold binder as defined in patent application FR 2 909 665. Such a binder is said to be reactive for cold curing and comprises: a basic binder having a viscosity of less than 1500 MPa·s at 20° C., consisting of a mixture of fatty acids, at least one reactive adjuvant capable of adequately reacting with the basic binder, and at least one activator capable of initiating the reaction. Such a binder corresponds to the binder marketed by the Colas company under the Colquick® brand name.

As an example, according to another embodiment in which the draining layer 1 is prepared hot, the bituminous binder complies with standard NF EN 12591 or with standard NF EN 14023, corresponding to the binder marketed by the Colas company under the COLFLEX brand name.

A binder that is suitable for the invention can also be a hydraulic binder. By known means, the hydraulic binder is a binder that is formed and hardens by a chemical reaction with water and is also capable of doing this under water.

For example, the hydraulic binders that are deemed suitable for the invention are the binders defined in any one of the following standards: NF EN 13282-1 (May 2014) "Hydraulic binders for roads with rapid kinetics—Composition, specifications, and compliance criteria," NF EN 13282-2 (September 2015) "Hydraulic binders for roads with normal kinetics—Composition, specifications, and compliance criteria," NF EN 197-1, or a mixtures thereof.

Generally, the hydraulic binder for roads is anhydrous and corresponds to an intimate mixture which is done either before or after grinding of one or more components: a clinker, by-products from other industries (slags, fly ash) which undergo a selection and a more or less elaborate preparation for the purpose of being incorporated into the binders; natural products which, for the purpose of being incorporated into the binders, do not undergo any treatment other than drying and pulverizing (fillers, natural pozzolans) and a hardening activator (generally lime).

As an example, the hydraulic binder marketed by the EQIOM company under the ROC AS trade name is suitable as a hydraulic binder according to the invention.

Generally, the coating of the granular mixture by the hydraulic binder is done cold, that is, at ambient temperature (i.e.: 5-35° C.).

Other binders that are not bituminous or hydraulic may be used in order to form the draining layer 1 according to the invention, such as organo-mineral binders.

According to the invention, "organo-mineral" refers to a binder in the form of an aqueous phase dispersion of a mixture of organic polymers (such as natural elastomers) and inorganic polymers (mineral nanoparticles).

For example, binders such as Aqua-Rev®, which is a single-component organo-mineral binder, or Aqua-Lib®, which is an aqueous-phase single-component binder resulting from a combination of a carbonate-bearing mineral matrix (CAS 1317-65-3) with an organic matrix, marketed by the INMS company, are suitable as organo-mineral binders according to the invention.

With such an organo-mineral binder, the mixing is most often done cold (ambient temperatures), with the cohesion of the granular mixture being ensured through open-air drying.

This type of organo-mineral binder has the advantage of being more environmentally safe than the hydraulic and bituminous binders described above. For example, the Aqua-Lib® binder has earned the INERIS 165712/12 certification demonstrating that this binder meets numerous environmental criteria.

In particular, the binder accounts for less than 5% by weight, preferably from 1% to 10%, with respect to the total weight of the draining layer.

Generally, the mass concentration of binder will depend on the type of binder used. As an example, in relation to the total weight of the draining layer 1, the binder may account for:

0.5% to 5% by weight, preferably 1% to 4% by weight, and typically 1.4% to 3% by weight when the binder used is a bituminous binder;

5% to 15% by weight, preferably 6% to 14% by weight, and typically 8% to 12% by weight when the binder used is a hydraulic binder; and 1.5% to 10% by weight, preferably 2% to 8% by weight, and typically 3% to 6% by weight when the binder used is a non-bituminous binder or a non-hydraulic binder, that is, for example, an organo-mineral binder.

In general, the draining layer 1 has a layer thickness suitable for or configured so as to ensure a good mechanical strength of the draining composition 10 according to the invention, and therefore of the light-traffic pavement 100 comprising said composition. In addition, the draining layer 1 has a layer thickness suitable for or configured so as to also enable the absorption of rain water and its percolation through the ground, thus avoiding the need to create a drainage system.

Thus, the draining layer 1 generally has a layer thickness ranging from 5 to 25 cm, preferably ranging from 7 to 20 cm, and even more preferably ranging from 8 to 15 cm, and typically ranging from about 9 to 12 cm, and perhaps on the order of 10 cm.

As part of the invention, a thickness ranging from 5% to 25% comprises the following values or any range between any two of these values: 5; 6; 7; 8; 9; 10; 11; 12; 13; 14; 15; 16; 17; 18; 19; 20; 21; 22; 23; 24; and 25 cm.

As mentioned earlier, the draining layer 1 is directly covered with a free layer 2, which will be described in greater detail below.

This free layer 2 has a granular size distribution that is different from the granular size distribution of the granular mixture comprised in the draining layer 1. Indeed, the granular mixture of the free layer 2 has a granular size distribution or is composed of granular fractions/classes less than those of the granular mixture of the draining composition 1.

According to a feature of the invention, at least 80%, preferably at least 85%, in particular at least 90%, and typically 90% to 100% by weight, with respect to the total weight of the granular mixture of the second granular layer, has a granular size distribution ranging from 2 to 14 mm, referred to hereinafter as 2/14.

According to the invention, "at least 80% by weight, with respect to the total weight of the granular mixture, has a granular size distribution ranging from 2 to 14 mm (2/14)" comprises the following values or any range between any two of these values: 80; 81; 82; 83; 84; 85; 86; 87; 88; 89; 90; 91; 92; 93; 94; 95; 96; 97; 98; 99 and 100%.

Generally, the granular mixture of the free layer 2 (2/14) comprises the following granular size classes (as defined above): 2/4 mm; 4/6 mm; 6/10 mm, 10/14 mm, or one of the mixtures thereof, and preferably the following granular size classes: 2/4 mm; 4/6 mm or one of the mixtures thereof. These granular size classes are understood in accordance with standard NF P P18-545 (September 2011).

Preferably, the D60/D10 uniformity coefficient (UC), as measured by sifting, of the granular mixture of the free layer 2 and as defined above is equal to or less than 6, even more preferably equal to or less than 5, and typically equal to or less than 4.

The granular mixture of the free layer 2 may be composed of natural, artificial, or recycled aggregates and are generally natural aggregates (as defined above).

According to the invention, the aggregates of the free layer 2 can be gravel, pea gravel, or a mixture thereof, without limitation.

The aggregates used can be road aggregates complying with the following standards: NF P 18545 (2003) in Europe and ASTM C33 in the United States of America.

Generally, the aggregates of the free layer 2 have a true density, as measured according to standard NF EN 1097-6, greater than 2000 kg/m$^3$ and even greater than 2500 kg/m$^3$, and a bulk density, as measured according to standard NF EN 1097-3, of between 1.2 and 1.7.

In general, the free layer 2 has a layer thickness ranging from 1.5 to 5 cm, preferably ranging from 2 to 4 cm, and even more preferably ranging from 2 to 3 cm.

As part of the invention, a thickness ranging from 1.5 to 5 cm comprises the following values or any range between any two of these values: 1.5; 2; 3; 4 and 5 cm.

As mentioned earlier, such a thickness has the advantage of not forming a water reserve for possible plants and grasses. Indeed, a greater thickness of the free layer 2 could promote the growth of plants and a smaller thickness could result in damage to the draining layer 1.

In particular, the granular mixture of the free layer 2 can be composed of aggregates of any color, which will depend on the desired esthetics (white, beige, and black gravel paths, among others).

However, according to a particular embodiment, the granular mixture of the free layer 2 can be a dark color and be composed, for example, of aggregates that are gray, black, Bordeaux, brown, and other colors, or a mixture thereof.

This last feature has the additional advantage of causing a thermal effect (increase in the temperature at the surface of the free layer 2) capable of more readily preventing and/or destroying any growth of plants and/or grasses.

According to a particular embodiment of the invention,
when the granular mixture of the draining layer 1 has the fraction 4/12.5; 4/10 mm; 6.3/10 mm; 6/12.5 mm, the granular mixture of the free layer 2 has the fraction 2/4 mm;

when the granular mixture of the draining layer 1 has the fraction 10/14 mm, the granular mixture of the free layer 2 has the fraction 4/6 mm;

when the granular mixture of the draining layer 1 has the fraction 14/20 mm, the granular mixture of the free layer 2 has the fraction 6/10 mm.

For example, the draining composition 10 according to the invention may comprise the granular mixtures shown in table 1 below, preferably in combination with the thicknesses of the draining layer 1 and of the free layer 2 also indicated in the table:

TABLE 1

| Draining composition 10 Air | Ex. 1 | Ex. 2 | Ex. 3 |
|---|---|---|---|
| Free layer 2 Granular size | 2/4 | 4/6 | 6/10 |
| Thickness | | 2-3 cm | 5 cm |
| Draining layer 1 Granular size | 6/10 | 10/14 | 14/20 |
| Thickness | | 10 cm | 15 cm |

The draining composition 10 according to the invention can be implemented according to techniques known to a person skilled in the art.

In particular, the method for implementing the draining composition 10 on a capping layer or a roadbed in order to form a road pavement comprises the following steps:

(a) as applicable, preparation of the capping layer or the roadbed (planing off) where the draining composition according to the invention is to be applied;
(b) preparation of the draining layer 1 by cold or hot mixing (mixture of the first 6/20 granular mixture with possibly the 0/4 and/or 0/2 granular mixture described above with the binder) in a mixer, for example a flat mixer, so as to obtain a coated material;
(c) spreading of said coated material obtained upon completion of step (b) on the capping layer or the roadbed made, as applicable, upon completion of step (a) manually or by mechanized means (such as a finisher), followed by a compacting step and even, if applicable, a cooling step (in the case of a hot mix);
(d) spreading of the free layer 2 on the bound layer forming the draining layer 1 obtained upon completion of step (c), for example by raking.

The compacting step is done lightly by means of a tandem roller, for example, so as to set the aggregates forming the granular mixture.

In particular, upon completion of the compacting step, the draining layer 1 has an installed density equal to or greater than 1.0 t/m³, preferably ranging from 1.2 to 2.5 t/m³, in particular ranging from 1.5 to 2.0 t/m³, and typically ranging from 1.6 to 1.8 t/m³.

Generally, before proceeding with step (d), the draining layer 1 formed upon completion of step (c) is allowed to rest for about one day in the case of a hot bituminous product, for at least 3 days in the case of a cold bituminous product, in particular 5 days when an organo-mineral binder is used, and typically about 7 days when a hydraulic binder is used (referred to as curing days).

These curing days allow for a mechanical bond between the aggregates by increasing the cohesion of the various binders used, whether they are bituminous, hydraulic, or organo-mineral.

Thus, according to one embodiment, preparation of the draining layer (step (b)) is done by hot mixing in a continuous or batch-type hot mixing plant and may comprise the following sub-steps:
heating of the binder, generally a bituminous binder suitable for hot mixing, to a high enough temperature to reach a viscosity on the order of, for example, 200 MPa·s, for example to a temperature of at least 110° C. and which may range from 120 to 170° C., in order to achieve a good coating of the granular mixture;
incorporation of the granular mixture comprised in the draining layer 1;
mixing of the mixture coming from the above step so as to obtain a coated material composition in a mixer or a drying drum.

According to another embodiment, preparation of the draining layer (step (b)) can be done by cold mixing and may comprise the following sub-steps:
mixing of the granular mixture comprised in the draining layer 1 with the binder, most often a bituminous binder capable of being implemented cold, such as the Colquick® binder marketed by Colas, a hydraulic binder, or an organo-mineral binder as described above, in a mixer (flat mixer) for a time which can range from 10 seconds to 5 minutes at an ambient temperature greater than 5° C. and less than or equal to 35° C. and preferably ranging from 15° C. to 25° C.

Preferably, the draining composition 10, and in particular the draining layer 1, will be implemented cold.

Upon completion of step (d), that is, after the free layer 2 has been applied, the draining composition 10 can be used immediately.

The subject matter of the present invention is also a light-traffic road pavement comprising the draining composition 10 as described above.

In particular, the light-traffic road pavement has a wet phase resistivity of at least 3000 ohm-meters (measured according to an internal protocol of the RTE company, which will be described below in the experimental portion).

Lastly, the subject matter of the present invention is the use of a draining composition as defined above or of the road pavement mentioned above,
to limit or prevent the growth of plants, such as weeds, and/or
to reduce or eliminate the use of phytosanitary products.

The following non-limiting examples exemplify the present invention. In the following examples the values are expressed in terms of weight, unless a different measurement is indicated.

F*) EXAMPLES

1. Test Procedures

The following test procedures have been used to evaluate the properties of the draining composition according to the invention:

1.1) Resistivity Test (FIG. 3) Performed by Means of an Electric Current Generator and a Voltmeter.

The resistivity tests were conducted following the protocol of the RTE company, which is summarized below:

Principle:

By injecting a current into a circuit connecting two electrodes separated by a layer of a composition being tested, and by measuring the difference in potential between the electrodes, it is possible to deduce the resistivity of the composition being tested. For a 1 m² measurement laboratory with a height of 10 cm of composition being tested between the electrodes, the calculation starts with the electric field E:

$$\vec{E} = \rho \cdot \vec{J} \qquad \text{[Math 1]}$$

in other words, considering the x-axis for the height of composition being tested, and without taking into account the sign:

$$\frac{dV}{dx} = \rho \cdot \frac{I}{s} \qquad \text{[Math 2]}$$

which is equivalent to:

$$\rho = \frac{\Delta V \cdot S}{I \cdot dx} \qquad \text{[Math 3]}$$

Where S=1 m² and a height dx of 0.1 m, the resistivity of the composition being tested is expressed as:

$$\rho = 10 \times \frac{\Delta V}{I} [\Omega m] \qquad \text{[Math 4]}$$

The adequacy of the injected current is determined:

$$R = \frac{\Delta V}{I} = \rho \cdot \frac{dx}{S} = 3000 \times \frac{0.1}{1} = 300 \; \Omega \quad \text{[Math 5]}$$

The generator used for the injected current is a "MITIU" 100 V–5 A–100 VA generator.

Consequently, an injection on the order of 300 mA can be expected, which is a sufficient value for a significant measurement.

Equipment Required by the Test Laboratory:
- 4 PVC boards measuring 140 cm long and 30 cm high, and thick enough so as not to become deformed when filled. These boards are provided with notches for assembly and may include a marking so as to achieve a consistent thickness of 10 cm from the bottom of composition being tested. Once assembled, these boards form a square surface of 1 m²;
- 2 rectangular screens, made of aluminum for example, measuring at least 100 cm×140 cm;
- Possibly a small amount of sand to cover the bottom of each frame if the frame cannot be placed on natural ground;
- A system for wetting the gravel.

Figure 3:
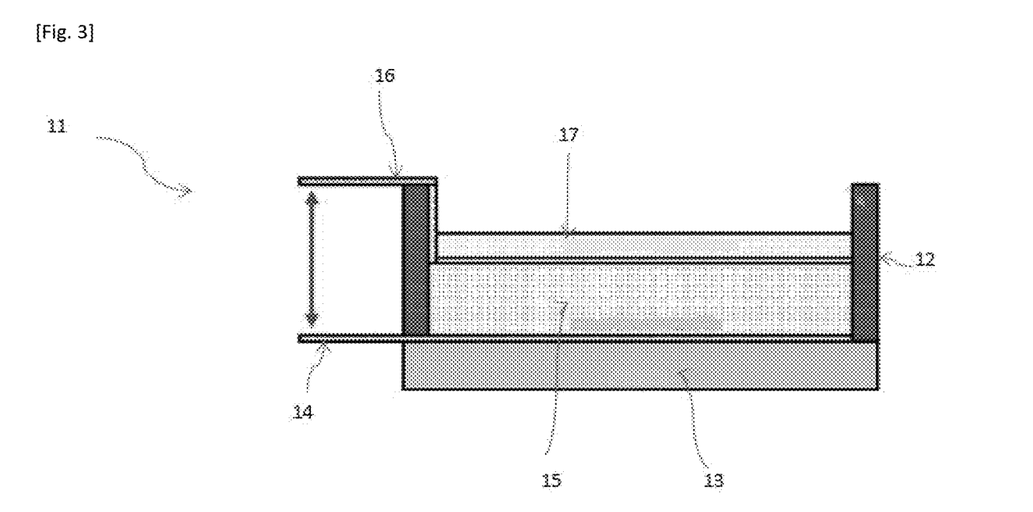
FIG. 3 is a diagram illustrating the method for measuring the resistivity according to the internal protocol of the RTE company.

Construction of the Test Laboratories 11:

As shown in FIG. 3, a square frame 12 with a ground surface area of 1 m² and a height of 30 cm is made with the 4 PVC boards. A first rectangular screen 14 is positioned between the frame 12 and the ground or the layer of sand, measuring about 0.5 cm thick 13 so as to extend beyond the frame on one side by about 20 cm to allow for connection. The frame is filled with a 10-cm thickness of the composition being tested 15 according to the invention, up to the marking if applicable.

The contact resistance is measured with a "foot" electrode to which is applied enough weight to provide pressure. After the measurement, the consistent thickness of 10 cm of composition being tested is restored. The rectangular screen 16 is placed on the surface of the composition being tested 15 so as to extend beyond the frame, just like the first rectangular screen, by about 20 cm in order to connect the measurement circuit.

The frame is filled with a thickness of about 10 cm of gravel 17, such as fixing aggregates, to ensure good pressure on the second rectangular screen 16. The resistivity measurement is taken between the two rectangular screens 14 and 16. One measurement is taken under dry conditions and one measurement is taken after wetting the gravel. After the wet measurement has been taken and once the gravel 17 and the second rectangular screen 16 have been removed, the measurement with the "foot" electrode described earlier is repeated.

1.2) Drainability Test

A drainometer test is conducted on the various test laboratories (see the section on "construction of the test laboratories") to measure the percolation rate of water in the draining composition. This test was conducted with a site drainometer according to standard NF EN 12697-40 (November 2012). Weights were applied in order to keep the drainometer on the complex.

1.3) Vegetation Tracking Over Time

The test laboratories, prepared according to the "construction of the test laboratories" section above, were installed outdoors and were tracked over time between early May and the end of October (1 week, 2 weeks, 1 month, 2 months, 3 months, 4 months, 5 months, 6 months, 7 months) to observe any plant growth on the surface of the tested draining composition according to the invention.

1.4) Percentage of Communicating Voids in the Draining Layer

During the preparation of the draining layer according to the invention, the weight of the materials used to fill the given volume of the test laboratory 11 makes it possible to determine the in situ density.

This in situ density is compared to the true density of the granular mixture constituting the draining layer in order to assess the percentage of communicating voids in that layer.

The percentage of communicating voids is determined by the following internal procedure, which draws upon standard NF P 98-254-2 (April 1993). The principle of this determination is to determine the volume of water to be poured onto the upper surface of a sample of known geometric volume, the other sides of which have first been sealed, until it cannot take any more. The test is conducted at ambient temperature between 15° C. and 25° C., and the result is the average of at least two tests.

The test is conducted as follows:

The sample to be tested is a cylindrical test piece with a minimum diameter of 150 mm and a height corresponding to the application height.

The proof body is measured for height and diameter to check its volume V, with a minimum of 5 height (h) and diameter (D) measurements to within 0.1 mm. The volume of the test piece is calculated.

Seal the proof body, without filling the lateral voids, using, for example, a plastic film, adhesive tape, etc.

Weigh the sealed proof body: weight M1 within 0.1 g.

Next, slowly pour water on the upper surface of the sample until it cannot take any more. Wait 5 minutes and repeat the operation, if necessary.

Weigh the sample thus treated: weight M2 within 0.1 g.

The result is calculated as follows:

Weight of added water: $M = M2 - M1$

Volume of the test piece: $V = \pi \times (D/2)^2 \times h$

Volume of percolated water: $v = M/\rho e$, the density of the water ($\rho e$) between 15° C. and 25° C. being 1 g/cm³.

Percentage of communicating voids: $Pc = v/V \times 100$.

2. Raw Materials

The following raw materials were tested to make the draining compositions according to the invention:

TABLE 2

| | Components | Supplier and/or item number |
| --- | --- | --- |
| Binder | Hot bituminous binder | Bitume Pur Grade 50/70 |
| | Cold bituminous binder | CS Colas Ecoliant binder |
| | Hydraulic binder | ROC AS binder |
| | Organo-mineral binder | Aqua-Lib ® binder (Colas) |
| | Slaked lime | |
| Draining layer granular mixture | 10/14 gravel | Limestone quarry of CCM (Comptoir des Calcaires et Matériaux) |
| | 4/12.5 gravel | Boulonnais limestone quarry |
| | 0/2 sand | Boulonnais quarry |
| Free layer granular mixture | 4/6 gravel | Limestone quarry of CCM |

The granular size distribution of the natural mineral aggregates used for the tests is as follows:

TABLE 3

| Sieve in mm | Aggregates | 0.063 | 2 | 4 | 8 | 10 | 12.5 | 14 | 16 | 20 |
|---|---|---|---|---|---|---|---|---|---|---|
| % passing through | 10/14 gravel | 1 | 1.8 | 2.2 | 5 | 12 | 57 | 88 | 99 | 100 |
| | 4/12.5 gravel | 1 | 2 | 4 | 45 | 70 | 90 | 98 | 100 | 100 |
| | 0/2 sand | 14 | 90 | 99 | 100 | 100 | 100 | 100 | 100 | 100 |
| | 4/6 gravel | 1 | 2 | 10 | 98 | 100 | 100 | 100 | 100 | 100 |

3. Tested and Implemented Draining Compositions 3.1) Tested Compositions

Five compositions of draining compositions according to the invention were prepared and are shown in table 4 below (the percentages are given by weight with respect to the total weight of the composition).

TABLE 4

| | Components\Compositions | Ex. 1 | Ex. 2 | Ex. 3 | Ex. 4 | Ex. 5 |
|---|---|---|---|---|---|---|
| Draining layer 10 cm | Hot bituminous binder | 3.7% | — | — | — | — |
| | Cold bituminous binder | — | — | — | — | 1.4% |
| | Hydraulic binder | — | 10% | — | 8% | — |
| | Slaked lime | — | — | — | — | 0.1% |
| | Organo-mineral binder | — | — | 3% | — | — |
| | 10/14 gravel | 96.3% | 90% | — | 74% | 98.5% |
| | 4/12.5 gravel | — | — | 97% | — | — |
| | 0/2 sand | — | — | — | 18% | — |
| Free layer 2-3 cm | 4/6 gravel | 100% | 100% | 100% | 100% | 100% |

3.2) Implementation of the Draining Layer

The various materials used in the composition of the draining layer were weighed and added in the following order: aggregates, then binder in a concrete laboratory mixer by the brand name DZ 100 VS by Diem marketed by the IGM company for examples 2 to 5, and in a laboratory mixer for coated material by the brand name Rosenbud Guedu marketed by the IGM company for example 1.

The parameters of the method were as follows:

Hot mixing (Ex. 1): according to standard NF EN 12697-35, maximum mixing time less than 3 minutes, temperature in compliance with the laboratory mixing directions.

Cold mixing (examples 2-5): mixing time until homogenization of the mixture, temperature: ambient.

The coated material thus formed was then placed in a tray as described earlier in section 1.1, sub-section "construction of the test laboratories."

4. Results

The results of the completed tests are given in table 5 below.

TABLE 5

| Tests | | Ex. 1 | Ex. 2 | Ex. 3 | Ex. 4 | Ex. 5 |
|---|---|---|---|---|---|---|
| Percentage of voids in the draining layer | | 20% ≤ ≤ 50% | 20% ≤ ≤ 50% | 20% ≤ ≤ 50% | 20% ≤ ≤ 50% | 20% ≤ ≤ 50% |
| Water percolation rate | | 5E–02 m/s to 10E–02 m/s | 5E–02 m/s to 10E–02 m/s | 5E–02 m/s to 10E–02 m/s | 5E–02 m/s to 10E–02 m/s | 5E–02 m/s to 10E–02 m/s |
| Dry resistivity ($\Omega \cdot m$) | | 22988506 | 6993007 | 7352941 | 285714 | 1886792 |
| Resistivity with wet materials ($\Omega \cdot m$) | | 117647 | 2286 | 14286 | 4505 | 40000 |
| Resistivity while wetting ($\Omega \cdot m$) | | 13333 | 1118 | 3880 | 2222 | 7407 |
| Vegetation tracking | 1 week | None | None | None | None | None |
| | 2 weeks | None | None | None | None | None |
| | 1 month | None | None | None | None | None |
| | 2 months | None | None | None | Small shoots | None |
| | 3 months | None | None | None | Very spotty small shoots | None |
| | 4 months | None | None | Very spotty small shoots | Very spotty small shoots | None |
| | 5 months | None | None | None | None | None |
| | 6 months | None | Very spotty small shoots | None | None | None |

None = nothing to note, i.e. no growth of plants and/or grasses was observed.

As shown in this table 5, we can see that out of the five compositions tested, there was some regrowth of plants in two of the compositions, but it did not last. Indeed, the regrowth disappeared after a few days for lack of water.

Consequently, the draining composition according to the invention make it possible to limit and even prevent the growth of plants and/or grasses. The use of phytosanitary products was not necessary, at least over the tested period, that is, 6 months (spring/summer period).

In addition, with the exception of example 2, the draining compositions according to the invention are suitable for making detection paths for the electrical power transformer substations of the Electrical Power Grid (RTE). The wet-phase resistivity measurement is indeed greater than 3000 Ω·m.

Naturally, various other modifications may be made to the invention within the context of the enclosed claims.

The invention claimed is:

1. A draining composition for light-traffic road pavement intended to cover a ground, comprising:
   (a) a first granular layer, referred to as a draining layer, having a percentage of communicating voids ranging from 25% to 50%, and which comprises at least one binder and a granular mixture of which at least 80% by weight, with respect to the total weight of the granular mixture, has a granular size distribution ranging from 4 to 20 mm, said first granular layer having a layer thickness suitable for or configured so as to ensure the mechanical strength of the light-traffic road pavement;
   (b) a second granular layer, referred to as a free layer, having a main lower surface and a main upper surface, said main lower surface resting directly on said first granular layer and said main upper surface being in direct contact with the air, said second granular layer being composed of a granular mixture that is not bound by a binder and of which at least 80% by weight, in relation to the total weight of the granular mixture, has a granular size distribution ranging from 2 to 14 mm, said second granular layer having a layer thickness suitable for or configured so as not to cause water accumulation,
   the granular mixture of the second granular layer having a granular size distribution which is less than that of the granular mixture of the first granular layer.

2. The draining composition according to claim 1, wherein said first granular layer has a percentage of communicating voids ranging from 30% to 40%.

3. The draining composition according to claim 1, wherein at least 85% by weight, with respect to the total weight of the granular mixture of the first granular layer, has a granular size distribution ranging from 6 to 20 mm.

4. The draining composition according to claim 3, wherein at least 90% by weight, with respect to the total weight of the granular mixture of the first granular layer, has a granular size distribution ranging from 6 to 20 mm.

5. The draining composition according to claim 3, wherein from 85% to 100% by weight, with respect to the total weight of the granular mixture of the first granular layer, has a granular size distribution ranging from 6 to 20 mm.

6. The draining composition according to claim 1, wherein the granular mixture of the first granular layer comprises at least one of the granular size fractions selected from the group consisting of 4/12.5 mm; 4/10 mm; 6.3/10 mm; 6/12.5 mm; 10/14 mm and 14/20 mm.

7. The draining composition according to claim 1, wherein said first granular layer has a layer thickness ranging from 5 to 25 cm.

8. The draining composition according to claim 7, wherein said first granular layer has a layer thickness ranging from 7 to 20 cm.

9. The draining composition according to claim 7, wherein said first granular layer has a layer thickness ranging from 8 to 15 cm.

10. The draining composition according to claim 1, wherein said first granular layer has a water percolation rate equal to or greater than $1 \times 10^{-5}$ m/s, measured according to standard NF EN 12697-40.

11. The draining composition according to claim 10, wherein said first granular layer has a water percolation rate ranging from $5 \times 10^{-2}$ m/s to $8 \times 10^{-2}$ m/s measured according to standard NF EN 12697-40.

12. The draining composition according to claim 1, wherein at least 85% by weight, with respect to the total weight of the granular mixture of the second granular layer, has a granular size distribution ranging from 2 to 14 mm.

13. The draining composition according to claim 12, wherein at least 90% by weight, with respect to the total weight of the granular mixture of the second granular layer, has a granular size distribution ranging from 2 to 14 mm.

14. The draining composition according to claim 1, wherein the granular mixture of the second granular layer comprises at least one of the granular size fractions selected from the group consisting of 2/4 mm; 4/6 mm; 6/10 mm and 10/14 mm.

15. The draining composition according to claim 1, wherein said second granular layer has a layer thickness ranging from 1.5 to 5 cm.

16. The draining composition according to claim 15, wherein said second granular layer has a layer thickness ranging from 2 to 4 cm.

17. The draining composition according to claim 6, wherein:
   when the granular mixture of the first granular layer comprises at least one of the granular size fractions selected from the group consisting of 4/12.5, 4/10 mm, 6.3/10 mm and 6/12.5 mm, the granular mixture of the second granular layer has the fraction 2/4 mm;
   when the granular mixture of the first granular layer has the fraction 10/14 mm, the granular mixture of the second granular layer has the fraction 4/6 mm;
   when the granular mixture of the first granular layer has the fraction 14/20 mm, the granular mixture of the second granular layer has the fraction 6/10 mm.

18. The draining composition according to claim 1, wherein the binder of the first granular layer is chosen from a bituminous binder, a hydraulic binder, an organo-mineral binder, or a mixture thereof.

19. The draining composition according to claim 1, wherein the binder accounts for less than 15% by weight, with respect to the total weight of the first granular layer.

20. A light-traffic road pavement comprising the draining composition according to claim 16.

21. The light-traffic road pavement according to claim 20, having a wet-phase resistivity of at least 3000 ohm-meters.

* * * * *